US008144758B2

(12) United States Patent
McKown

(10) Patent No.: US 8,144,758 B2
(45) Date of Patent: *Mar. 27, 2012

(54) METHOD AND APPARATUS FOR SINGLE BURST EQUALIZATION OF SINGLE CARRIER SIGNALS IN BROADBAND WIRELESS ACCESS SYSTEMS

(75) Inventor: Russell McKown, Richardson, TX (US)

(73) Assignee: Advanced Receiver Technologies, LLC, Dallas, TX (US)

( * ) Notice: Subject to any disclaimer, the term of this patent is extended or adjusted under 35 U.S.C. 154(b) by 783 days.

This patent is subject to a terminal disclaimer.

(21) Appl. No.: 12/157,738

(22) Filed: Jun. 12, 2008

(65) Prior Publication Data

US 2009/0185612 A1 Jul. 23, 2009

Related U.S. Application Data

(63) Continuation of application No. 10/796,596, filed on Mar. 9, 2004, now Pat. No. 7,388,910.

(60) Provisional application No. 60/453,162, filed on Mar. 10, 2003.

(51) Int. Cl.
*H03H 7/30* (2006.01)

(52) U.S. Cl. .................................. 375/232; 375/233

(58) Field of Classification Search .......... 375/229–233, 375/346
See application file for complete search history.

(56) References Cited

U.S. PATENT DOCUMENTS

| 5,117,291 | A | 5/1992 | Fadavi-Ardekani et al. |
| 5,636,244 | A * | 6/1997 | Goodson et al. ............... 375/231 |
| 5,694,424 | A | 12/1997 | Ariyavisitakul |
| 6,002,722 | A | 12/1999 | Wu |
| 6,012,161 | A | 1/2000 | Ariyavisitakul et al. |
| 6,754,261 | B1 | 6/2004 | Liu et al. |
| 7,103,177 | B2 * | 9/2006 | Tanrikulu et al. ......... 379/406.14 |
| 7,292,661 | B1 * | 11/2007 | Chan et al. ..................... 375/346 |
| 7,388,910 | B2 * | 6/2008 | McKown ...................... 375/232 |
| 2003/0007554 | A1 | 1/2003 | Birru |
| 2004/0001538 | A1 * | 1/2004 | Garrett .......................... 375/229 |
| 2004/0199559 | A1 * | 10/2004 | McAdam et al. ............. 708/322 |

* cited by examiner

*Primary Examiner* — Emmanuel Bayard

(57) ABSTRACT

A receiver implementing a single carrier single burst equalization (SC-SBE) method is capable of achieving near optimal reception of individual single carrier RF bursts by making an accurate estimate of the burst's propagation channel impulse response (CIR). The SC-SBE method uses a CIR based coefficient computation process to obtain filter coefficients for a minimum mean square error decision feedback equalizer (MMSE-DFE). The MMSE-DFE filter computation process computes a sufficiently large number of coefficients for the DFE filters, i.e., the feed forward filter (FFF) and feedback filter (FBF), so that each filter spans the maximum anticipated length of the CIR. In order to implement the filters efficiently, a coefficient selection process eliminates less significant computed FFF and FBF coefficients. The resulting FFF and FBF are sparse filters in that most of the taps in the filter delay lines do not have a filter coefficient. Such filters may be efficiently implemented in the time domain.

18 Claims, 8 Drawing Sheets

METHOD AND APPARATUS FOR SINGLE BURST EQUALIZATION OF SINGLE CARRIER SIGNALS IN BROADBAND WIRELESS ACCESS SYSTEMS

CROSS REFERENCE TO RELATED APPLICATIONS

This application is a continuation of U.S. patent application Ser. No. 10/796,596, filed on Mar. 9, 2004 now U.S. Pat. No. 7,388,910, which claims priority to a U.S. Provisional Application No. 60/453,162, filed on Mar. 10, 2003, entitled METHOD AND APPARATUS FOR SINGLE BURST EQUALIZATION, the content of each of which is incorporated herein by reference.

BACKGROUND OF THE DISCLOSURE

The development of wireless metropolitan area networks (WMAN's) and wireless local area networks (WLAN's) for broadband wireless access (BWA) to voice and data telecommunication services is an area of considerable economic and technological interest. The WMAN systems typically employ a point-to-multipoint topology for a cost effective system deployment. For example, proposed WMAN systems operating in the 2 to 6 GHz radio frequency (RF) range consist of base station cell tower sites with 3 to 6 antenna/transceiver sectors, with capacity goals of 40 to 80 Megabits per sector, and with coverage goals of 5 to 15 kilometer cell radius. Example WLAN systems include installations at areas both inside and outside of residences or businesses and public areas such as trains, train stations, airports or stadiums. These WMAN and WLAN systems can also be integrated to form a wide area network (WAN) that can be national or even global in coverage. WMAN systems are primarily discussed because they are technically the most challenging. However, the invention may also be used in broadband wireless access systems in general.

The primary problem in broadband wireless telecommunication is the considerable variation in the quality of the RF reception. The RF reception varies due to the type of terrain, due to the presence of obstacles between the base station and the subscriber station (SS), and due to the fairly high probability of receiving the same transmission by means of multiple RF propagation paths. The latter problem is referred to as "multipath" and the above set of reception problems is often collectively, and loosely, referred to as the non-line-of-sight (NLOS) reception problem. When the SS is moving, there is the additional problem of Doppler induced channel variability. A robust NLOS BWA system for fixed or mobile subscribers is a technical challenge.

The WMAN systems of interest typically have RF channels that are the composite of multiple radio propagation paths over large distances. A consequence of these multipath propagation channels is that the received radio signal waveforms are distorted relative to the original transmitted radio signal waveforms. Prior art high data rate WMAN signaling technologies that are intended to mitigate the multipath performance degradations are orthogonal frequency division multiplexing (OFDM) and single carrier with frequency domain equalization (SC-FDE).

FIGS. 1 and 2 are diagrams of known OFDM and SC-FDE methods of transmitting and receiving signals with digital data modulations through dispersive propagation channels that impose some degree of multipath signal distortions. These diagrams emphasize the method specific signal processing elements and illustrate their dependence on FFT block processing.

FIG. 1 shows a block diagram illustrating certain processes performed by a system implementing the OFDM method. An inverse fast Fourier transform (inverse FFT) 110 transforms the data (symbols) 108 to be transmitted. Cyclic prefix insertion process 112 creates a serial output block with ends that are circular in content. These processes occur within OFDM transmitter 114. The transmitter output 115 passes through a propagation channel 116 to become input 117 to OFDM receiver 118. The method specific processes the OFDM receiver include a forward fast Fourier transform (FFT) process 120 that creates intermediate data symbols that have been distorted by the propagation channel, a process 122 to invert the channel and a process 124 to detect the original symbols, i.e., to provide the received data output 126. The OFDM symbol detection process 124 may, for example, include Viterbi decoding, symbol de-interleaving, and Reed-Solomon forward error detection/correction (FEC). The specific detection process 124 depends on the coding/interleaving that was applied to the transmitted data symbols 108.

FIG. 2 shows a block diagram illustrating certain processes performed by a system implementing an SC-FDE method. The data symbols to be transmitted 128 are input to a preamble and cyclic prefix insertion process 130. The preamble sequence has good correlation properties to support channel estimation and the cyclic prefix insertion creates circular output blocks to simplify receiver FFT operations. These processes occur within SC-FDE transmitter 132. The transmitter output 133 passes through a propagation channel 134 to become input 135 to SC-FDE receiver 136. The method specific processes in SC-FDE receiver 136 include a forward FFT 138 process to transform the signal into the frequency domain, a frequency domain filter to invert the channel 140, an inverse FFT 142 to restore the signal to the time domain, and symbol detection 144 that provides the received data output 146. The SC-FDE symbol detection process 144 may include a non-linear decision feedback equalizer (DFE) in addition to decoding and de-interleaving operations. As in the OFDM method, the detection process 144 may, for example, include Viterbi decoding, de-interleaving, and a Reed-Solomon FEC, or functionally similar operations, depending on the coding/interleaving that was applied to the transmitted data symbols 128.

Operationally, the OFDM and SC-FDE systems differ mainly in the placement of the inverse FFT. In the OFDM method the inverse FFT is at the transmitter to code the data into the sub-carriers. In the SC-FDE method the inverse FFT is at the receiver to get the equalized signal back into the time domain for symbol detection. Although FIG. 2 shows the SC-FDE signal to have a cyclic prefix insertion 130, this is actually an option for SC-FDE that trades useable bandwidth for a slightly decreased number of receiver computations and a potential performance improvement. In the OFDM method, the cyclic prefix insertion 112 and the associated loss of useable bandwidth are mandatory.

For high data rate single carrier (SC) systems, WMAN multipath RF channel distorts the signal by mixing data symbols that were originally separated in time by anywhere from a few symbols to a few hundreds of symbols. This symbol mixing is referred to as inter-symbol interference (ISI) and makes the SC wireless link useless unless equalization is performed. It is generally agreed that traditional time domain adaptive equalization techniques are impractical to solve this problem since the computations per bit are proportional to the ISI span, which in the WMAN channels of interest can be hundreds of symbols. However, the FFT can be used to provide efficient frequency domain equalization for single carrier signaling. This is the basis of the single carrier frequency domain equalization (SC-FDE) method discussed above. SC-FDE is known to work well in terms of multipath mitigation and is practical in terms of transceiver computations per bit. A modem SC-FDE method is described by David Falconer, Lek Ariyavisitakul, Anader Benyamin-Seeyar and Brian Eidson in "Frequency Domain Equalization for Single-Carrier Broadband Wireless Systems", IEEE Communications Magazine, Vol. 40, No. 4, April 2002.

For high data rate OFDM systems, WMAN multipath RF channels often result in severe spectral nulls. These spectral nulls make the OFDM wireless link useless unless interleaving and coding are performed. Coherent OFDM also requires equalization. However, OFDM with interleaving, coding, and equalization is known to work well in terms of maintaining a WMAN link in the presence of multipath and is equivalent to SC-FDE in terms of transceiver computations per bit. A critical comparison of the OFDM and SC-FDE techniques is given by Hikmet Sari, Georges Karam and Isabelle Jeanclaude in "Transmission Techniques for Digital Terrestrial TV Broadcasting", IEEE Communications Magazine, February 1995.

SUMMARY OF THE DISCLOSURE

The invention allows for use of time domain equalization in single carrier broadband wireless systems, thereby overcoming one or more problems associated with using traditional time domain equalization techniques and avoiding the disadvantages of OFDM and SC-FDE systems.

An example of one use of a preferred embodiment of the invention is a receiver implementing a single carrier single burst equalization (SC-SBE) method. Such a receiver is capable of achieving near optimal reception of individual single carrier RF bursts. The receiver makes an estimate of the burst's propagation channel impulse response (CIR) and then uses a CIR-based coefficient computation process to obtain filter coefficients for a time domain equalization process. A subset comprising the most significant coefficients is selected for filters in the equalization process allowing more efficient implementation of the filters in the time domain.

For example, if a time a minimum mean square error decision feedback equalizer (MMSE-DFE) used a MMSE-DFE filter computation process computes a sufficiently large number of coefficients for the DFE filters, i.e., the feed forward filter (FFF) and feedback filter (FBF), so that each filter spans the maximum anticipated length of the CIR. For NLOS WMAN systems, this results in hundreds of computed coefficients for both the FFF and the FBF. In order to implement the filters efficiently, a coefficient selection process eliminates less significant computed FFF and FBF coefficients. The resulting FFF and FBF are "sparse" filters in that the sense that most of the taps in the filter delay lines do not have a filter coefficient. This allows the filters to be efficiently implemented in the time domain.

The availability of time domain, sparse equalization filters avoid problems associated with the prior art OFDM and SC-FDE methods which use block processing FFT procedures. These problems include a large block granularity that limits bandwidth efficiency. In contrast, the SC-SBE method allows the bandwidth efficiency to be maximized. The coefficient selection process improves the radio telecommunication link's performance for the majority of WMAN propagation channels. In the remaining WMAN channels the coefficient selection procedures assure that any performance degradation will be insignificant.

DETAILED DESCRIPTION OF THE INVENTION

Figure 1:
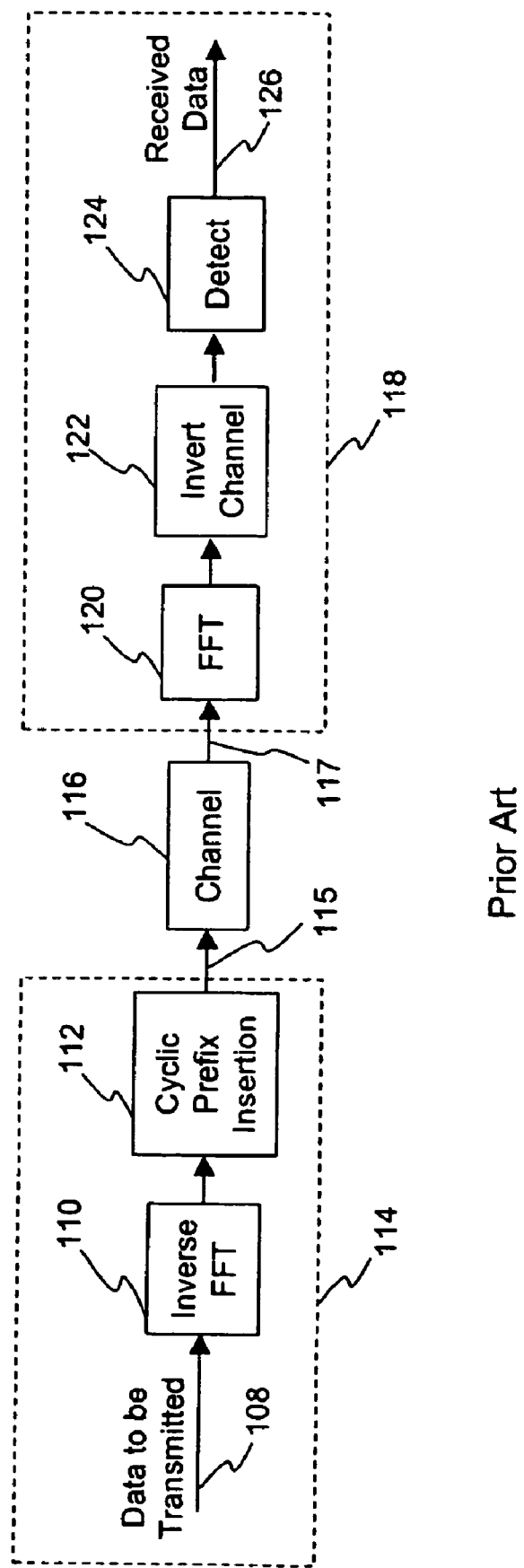
FIG. 1 is a block diagram of the transmitter and receiver implementing a prior art OFDM method.

A significant problem is created by both the OFDM and SC-FDE methods due to their reliance on the large block FFT operation. The problem, not recognized, is that the large block FFT operation restricts the efficiency of time division duplexing (TDD) and time division multiple access (TDMA) techniques. Modern TDD/TDMA techniques provide the opportunity for efficient use of a single RF channel for both downlink and uplink burst communication. For example, adaptive TDD/TDMA techniques, are defined in the IEEE Standard 802.16.TM.-2001. In the adaptive TDD technique the position in time of the border separating a TDD frame's downlink and uplink traffic is adapted to best suit the relative amount of downlink and uplink traffic. It is well known that when properly implemented adaptive TDD is more spectrally efficient than the older frequency domain duplexing (FDD) technique which simply uses 2 RF channels, one for downlink and one for uplink. Proper utilization of TDD/TDMA techniques, however, requires flexibility with respect to the allowed (allocated) burst durations since the burst durations that are desired depend on the variable size of the data to be transferred.

For WMAN systems, the OFDM and SC-FDE signaling techniques use an FFT whose size is typically in the 256 to 2048 sample point range. The problem is that the block FFT operations impose a large granularity on the TDD bandwidth allocation scheme that results in bandwidth inefficiency. The block restricted bandwidth allocation granularity is equivalent to the FFT size, in the range of 256 to 2048, or so, equivalent SC symbol time slots. This large TDD bandwidth allocation granularity significantly decreases the efficiency of a TDD/TDMA BWA system. Another problem with the OFDM and SC-FDE methods that results in bandwidth inefficiency is the periodic insertion of a cyclic prefix—this directly turns valuable bandwidth into overhead.

In contrast, methods and apparatus for single burst equalization of single carrier RF communications signals (SC-SBE), described in connection with FIGS. 3-7, do not require FFT operations or cyclic prefixes and provides greater flexibility in TDD bandwidth allocation, providing an allocation granularity/resolution of one single carrier symbol time slot.

This allows the time-frequency bandwidth efficiency to be optimized in a SC-SBE based TDD/TDMA BWA system. The SC-SBE method takes advantage of a coefficient selection process and a DFE that uses time domain sparse filters.

Note that the SC-SBE method and apparatus, described below in connection with FIGS. 3-7, has implementations at the system level of BWA systems, e.g., WLAN, WMAN and WAN systems, in components that make up the BWA systems, e.g., base station and subscriber station receivers, and in the circuits that make up the receiver or transceiver components. Unless otherwise represented, circuitry for performing the functions or processes referenced below may be implemented as hardware, software, or a combination of hardware and software. Implementation examples include software executing on a digital signal processor (DSP) or a general purpose computer, as well as logic elements executing in a field programmable gate array (FPGA) or an application specific integrated circuit (ASIC). Discrete functional blocks in the figures do not imply discrete hardware components.

Figure 2:
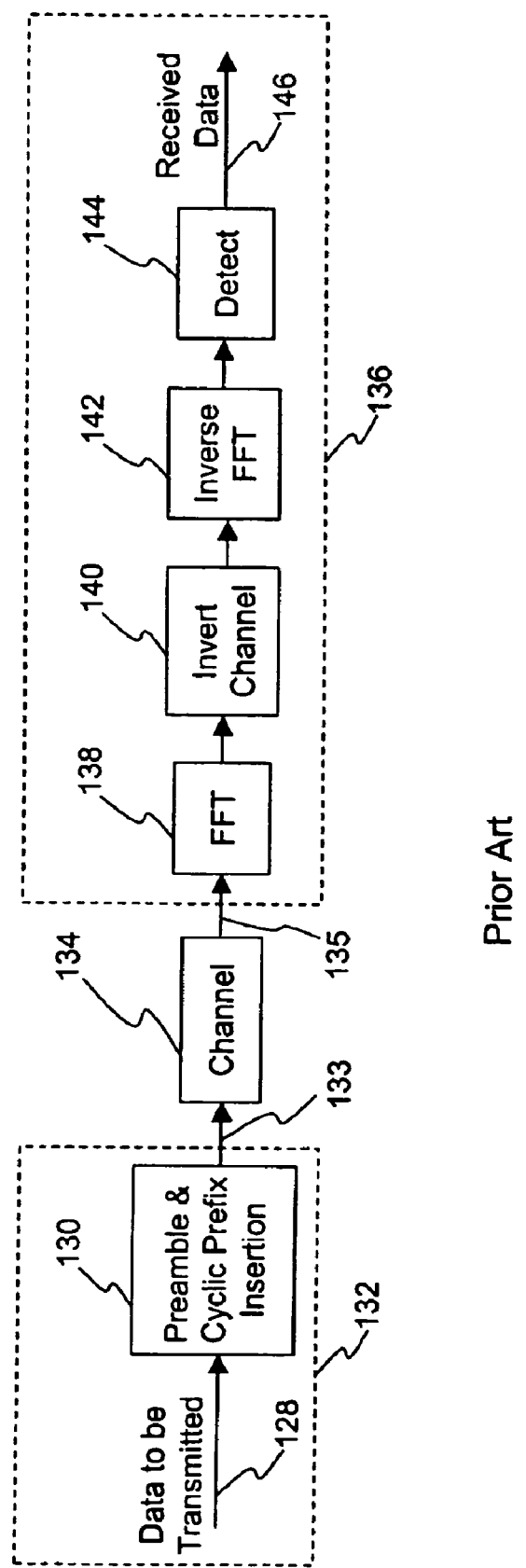
FIG. 2 is a block diagram of a transmitter and receiver that implement a prior art SC-FDE method.
Figure 3:
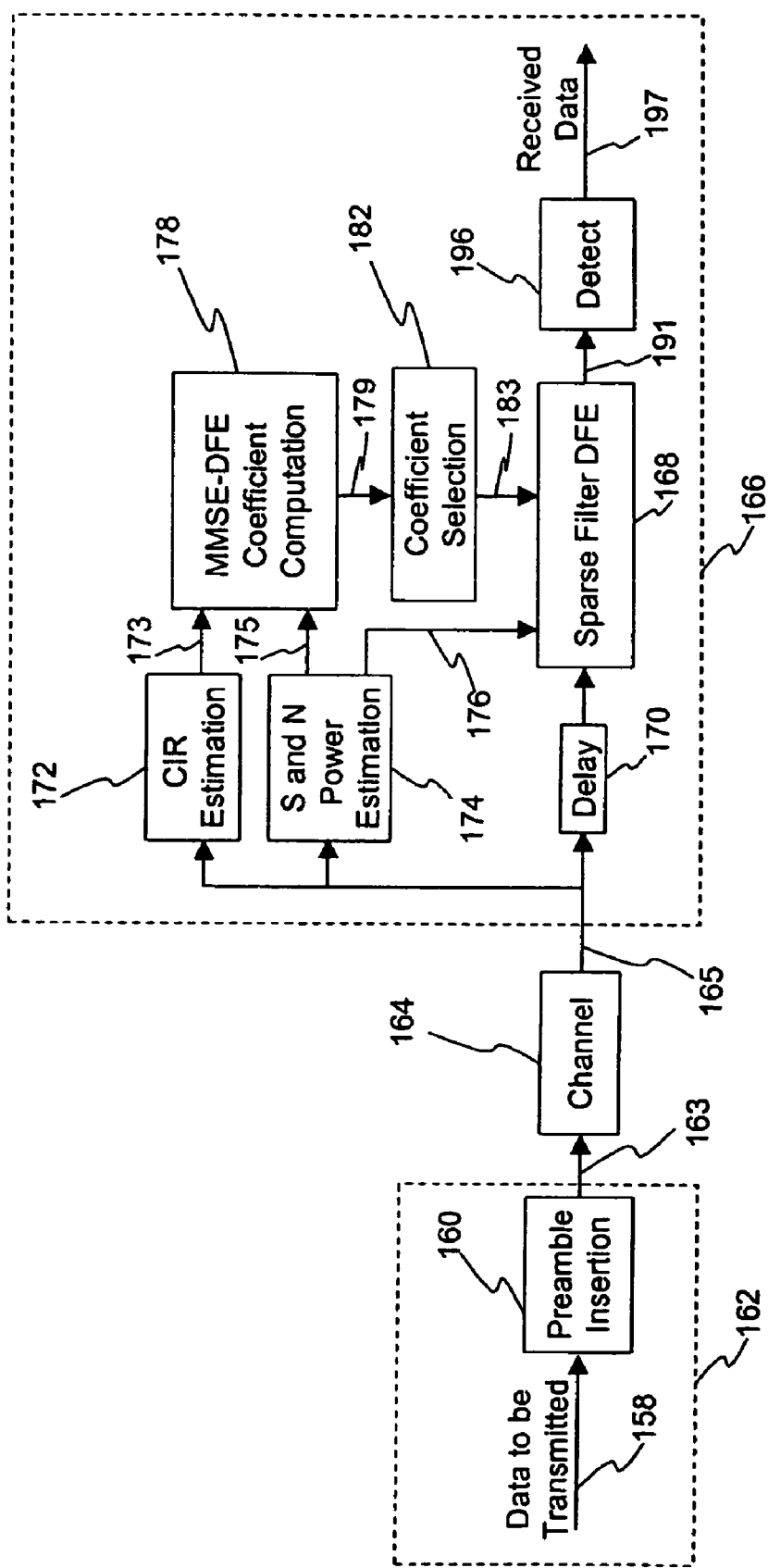
FIG. 3 is a block diagram of a transmitter and receiver implementing a SC-SBE method with a coefficient selection process and sparse filter DFE.
Figure 4:
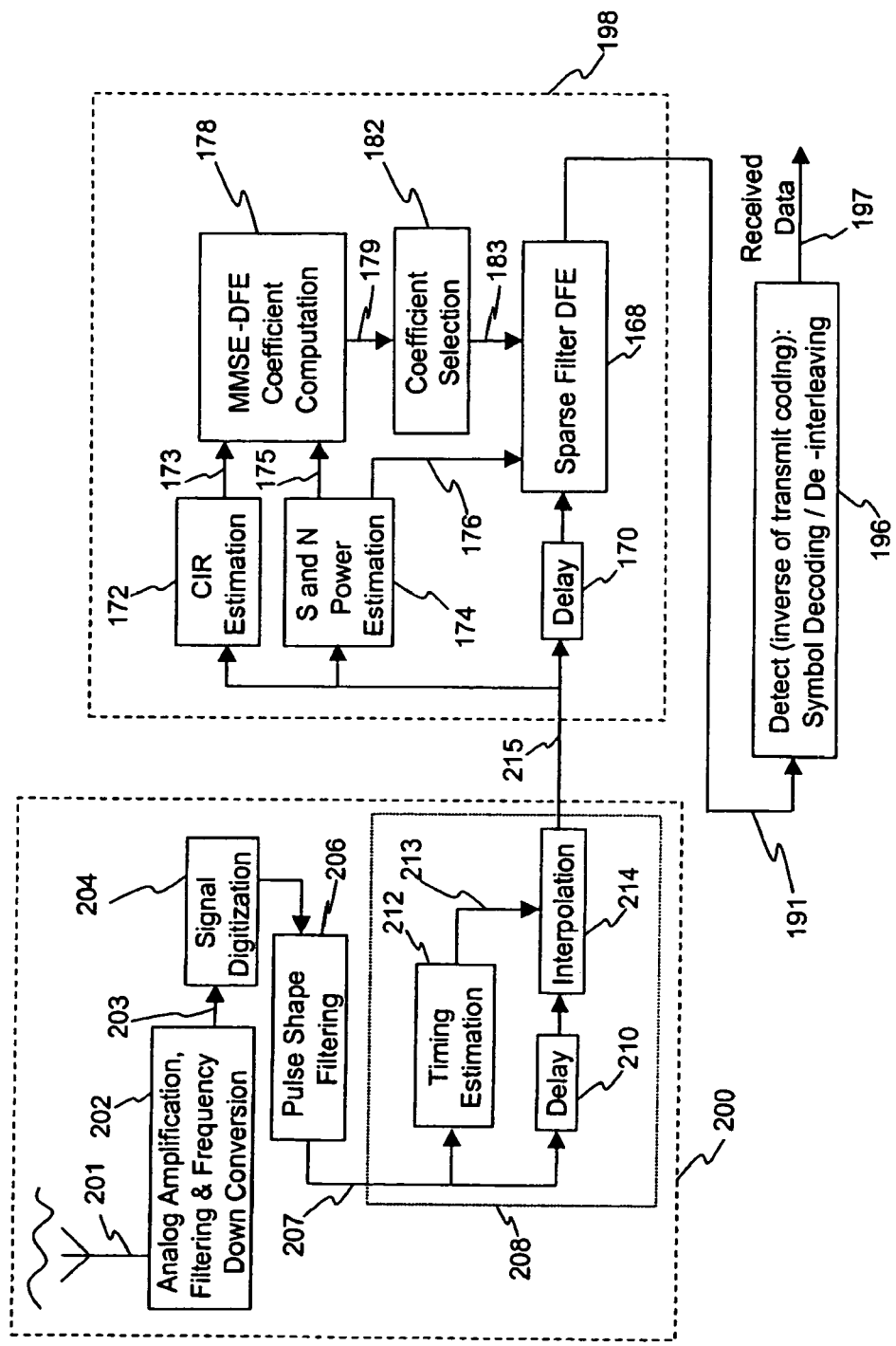
FIG. 4 is a block diagram of a transmitter and receiver that illustrates the SC-SBE operations relative to other operations in a single carrier receiver.
Figure 5:
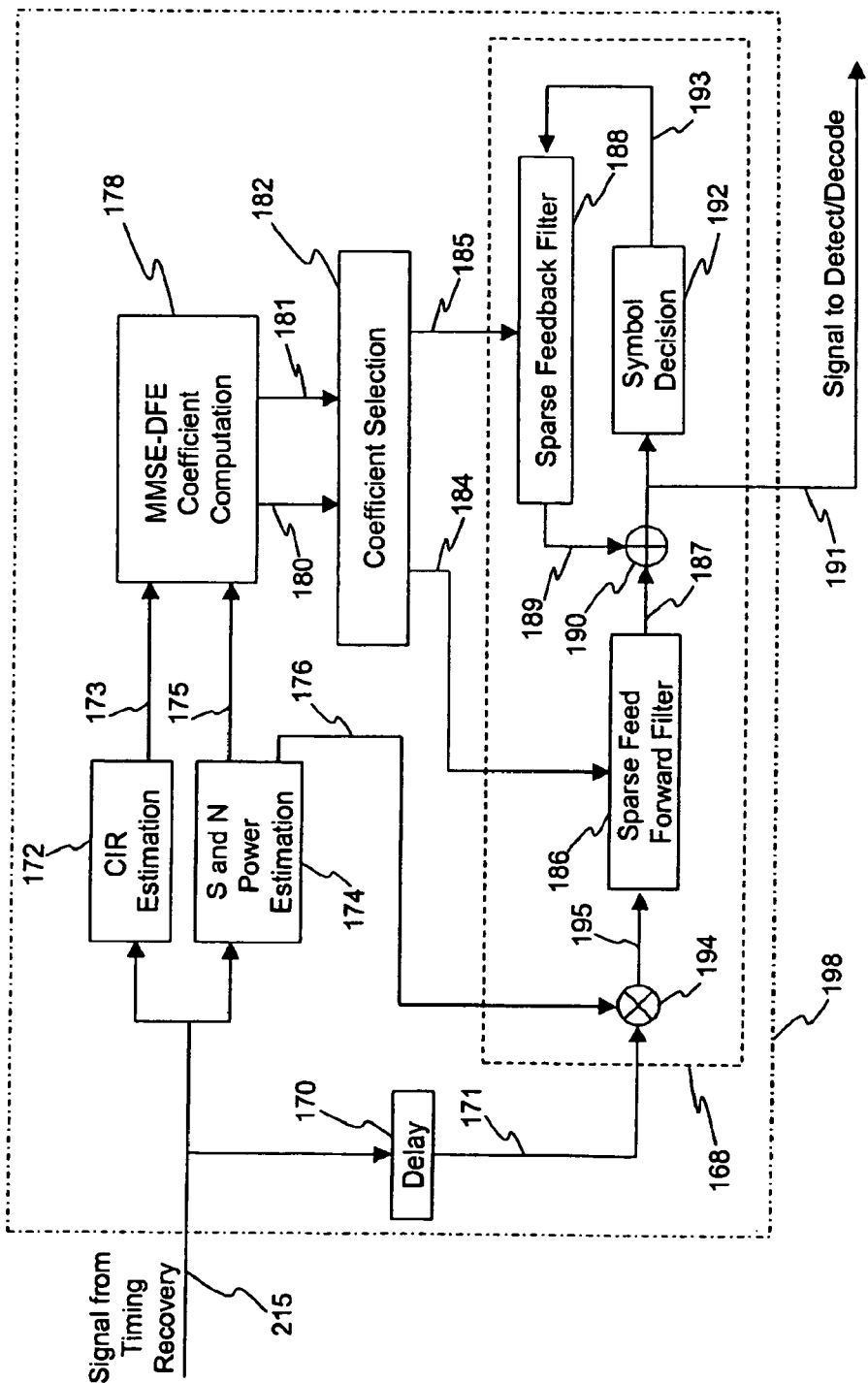
FIG. 5 is a block diagram of an SC-SBE processor.

FIGS. 3, 4 and 5 illustrate SC-SBE concepts with reference to functional block schematic diagrams of example embodiments of transmitters and receivers. FIG. 3 is a block diagram of an example of a SC transmitter and SC-SBE receiver that facilitates a comparison with the OFDM and SC-FDE methods diagrammed in FIGS. 1 and 2. FIG. 4 is a block diagram of a SC-SBE receiver that illustrates the relation of the SC-SBE operations to other receiver operations, in particular the SC-SBE functions as a pre-processor to standard detection circuitry such as a Viterbi decoder. FIG. 5 is an example of a SC-SBE DFE with sparse, time domain filters.

Referring to FIG. 3, the data symbols to be transmitted 158 by transmitter 162 are input to preamble insertion circuitry 160 that inserts a preamble symbol sequence having good correlation properties to facilitate an estimation of the propagation channel impulse response. The transmitter output 163 is an RF signal burst that passes through a propagation channel 164 to become the input 165 to receiver 166.

In receiver 166, multipath channel equalization is accomplished with a sparse filter DFE 168, described below. The input signal is delayed by a predetermined amount by delay circuit 170. The delay is to allow time for the following to take place. A CIR estimate 173 is computed by process 172. Estimates 175 of signal power and noise power are computed by process 178. The signal power estimate is used to set an input gain 176 for the sparse filter DFE 168. The MMSE-DFE filter coefficients 179 are computed by process 178 based on the CIR estimate 173 and the noise power estimate 175. The filter coefficient subset 183 is selected by process 182 using methods described below. The selected filter coefficient subset 183 allows a high performance DFE 168 based on efficient time domain sparse filters.

The DFE 168 provides channel equalized data 191 to symbol detection process circuitry 196 that performs symbol decoding and de-interleaving operations. The operations of symbol detection 196 are the inverse of the coding/interleaving operations applied to the transmitted data symbols 158. Symbol detection 196 provides the received data output 197 that is of interest to the media access control (MAC) layer of the BWA system's base stations or subscriber stations.

It is preferred that the processing delay 170 is less than the minimal RF signal burst duration which is on the order of 50 microseconds. This requirement insures that the receiver is capable of maintaining real time throughput at the TDD frame time scale which is on the order of 2 to 4 milliseconds.

FIG. 4 is a block schematic diagrams that illustrates the SC-SBE processing circuitry relative to other operations in one exemplary embodiment of a receiver. In this example an SC-SBE circuit 198 is inserted between a conventional SC receiver front-end/timing recovery circuit 200 and a conventional symbol detection circuit 196.

Referring to FIG. 4, in the SC receiver front-end processing circuitry 200, an RF signal is acquired by antenna 201 and processed by analog amplification, filtering and frequency down conversion 202 to provide a much lower frequency analog baseband or pass-band signal 203 that can be converted into digital samples by sampling circuitry 204 for subsequent digital signal processing. Pulse shape filter 206 provides signal matched filtering that eliminates out of band noise and provides a signal 207 suitable for feed-forward timing recovery circuitry 208. Timing recovery in the SC receiver front-end processor 200 is desirable since it allows subsequent processing to be performed more efficiently using only one digitized sample per symbol. To achieve the timing recovery, the flow of the digitized burst signal is delayed by a predetermined amount by delay circuit 210. The delay is to allow time for symbol timing recovery circuitry 212 to compute the timing offset estimate 213. The timing estimate 213 controls interpolation circuitry 214 which outputs near optimally sampled data 215 to the SC-SBE circuit 198.

As illustrated in FIG. 4, SC-SBE circuitry 198 can function as a pre-processor to a traditional symbol detection process or circuitry 196. For a more explicit example, symbol detection could be based on the transmit coding specified by the IEEE Standard 802.16a.TM.-2003. In this case the symbol detection circuitry 196 would be a Viterbi decoder, a de-interleaver and a Reed-Solomon FEC, followed by a de-randomizer to recover the transmitted data of interest. The SC-SBE circuitry 198 does not depend on, nor require knowledge of, the type of symbol detection circuitry 196 that follows it. The detection circuitry 196 outputs the received data 197 that is sent to a MAC layer, not shown.

Referring to FIG. 4, the CIR estimation process 172 in the SC-SBE circuit 198 can, for example, be performed with known non-parametric cross-correlation techniques in which the received preamble data is cross-correlated with the transmitted preamble data. Example preambles that are well suited for a cross-correlation based CIR estimation are the so called constant amplitude zero autocorrelation (CAZAC) sequences. The IEEE Standard 802.16a.TM.-2003 specifies a CAZAC sequence for this purpose.

The signal (S) and noise (N) power estimation process 174 can be designed based on a variety of known methods. For example, a preamble composed of multiple CAZAC sequences can be Fourier transformed over a time interval spanning two contiguous sequences. The power at even harmonics of the total period is an estimate of the signal plus noise (S+N) power, whereas the power at odd harmonics is an estimate of the noise power, N 175. The signal only power can then be estimated by subtraction. The input gain 176 that is required by the sparse filter DFE 168 can be computed as the ratio of the desired signal level to the square root of the estimated signal power, S.

The CIR estimate 173 and the noise power estimate 175 are input to the MMSE-DFE filter coefficient computation process 178. Three alternative fast methods are known that can compute the filter coefficients 179 for an MMSE DFE from a CIR estimate and a noise power estimate. These published, computationally efficient MMSE-DFE coefficient computation procedures are: Naofal Al-Dhahir and John M. Cioffi, "Fast Computation of Channel-Estimate Based Equalizers in Packet Data Transmissions", IEEE Transactions on Signal Processing, pp. 2462-2473, 11, 43 (November 1995); Bin Yang, "An Improved Fast Algorithm for Computing the MMSE Decision-Feedback Equalizer", Int. J. Electronic Communications (AEU), Vol. 53, No. 6, pp. 339-345 (1999); and N. R. Yousef and R. Merched, "Fast Computation of Decision Feedback Equalizer Coefficients", U.S. Patent Application 2003/0081668 (May 1, 2003). Each of these coefficient computation procedures can be used to efficiently compute the large number, e.g., hundreds, of filter coefficients 179 that define the long time span filters required by the DFE for WMAN systems.

The reason channel equalization filters with long time spans are required is, that in order to be effective, the filters must span the maximum variability in the propagation delay in the multipath channel. This maximum variability is generally quantified by the 'delay spread' parameter. In order to characterize a multipath channel, it's CIR must be measured for delays somewhat larger than the delay spread. For example, in some WMAN systems, the multipath delay spread can exceed 10 microseconds and, typically, a single carrier signal having a 20 MHz bandwidth can be modulated with 16 million symbols per second. If the DFE filters for this SC system support the conventional minimum of one coefficient per symbol, this equates to greater than 160 coefficients per filter. It is straightforward to estimate the CIR over a 10 or more microsecond time span, for example using the above mentioned CAZAC cross-correlation technique. Furthermore, the above mentioned three alternative fast coefficient procedures provide means of computing the coefficients 179. However, to directly implement filters with such a large number of filter coefficients in the time domain would require an inordinately large amount of computation.

Indeed, this excessive time domain computation requirement was the motivation for the known SC-FDE method diagrammed in FIG. 2. However, as mentioned earlier, block FFT and cyclic prefix operations of the SC-FDE method create the problem of inefficient TDD/TDMA bandwidth utilization. The SC-SBE method and apparatus solve the computation problem by selecting a subset of the coefficients for a time domain filter. This time domain filter with sparsely populated coefficients (or "sparse" filter) provides approximation of the outputs of the time domain filter when all the calculated coefficients are used.

Thus, the coefficient selection process simplifies the DFE filters and improves receiver performance. Furthermore, a sparse time domain filter DFE allows efficient TDD/TDMA bandwidth utilization. The coefficient selection process 182 examines the large number of computed MMSE-DFE coefficients 179 to identify a much smaller subset of coefficients 183 to be used by the DFE filters. The sparse, time domain filters of DFE 168 efficiently implement these coefficients, avoiding the need for FFT filter techniques that result in TDD/TDMA inefficiency.

FIG. 5 shows, in more detail, a schematic block diagram of an example SC-SBE processing unit 198 in order to illustrate the sparse, time domain filter DFE circuit 168. Two outputs are shown from the coefficient computation process 178: a complete set of feed forward filter (FFF) coefficients 180 and a complete set of feedback filter (FBF) coefficients 181. The complete set of coefficients refers to the MMSE-DFE coefficient computation 178 providing the number of coefficients required to span the maximum time lag of the CIR estimate 173, which, given the above 20 MHz bandwidth WMAN system example, could result in 160 or more FFF and FBF coefficients, each. The coefficient selection process 182 inputs the complete set of coefficients, 180 and 181, and outputs a considerably smaller number of selected coefficients, 184 and 185, for use in defining a sparse FFF 186 and a sparse FBF 188, respectively.

The sparse FFF 186 and the sparse FBF 188 preferably have delay lines equal in length to the number of coefficients in the complete sets, 180 and 181, say greater than 160 each. However, the number of non-zero coefficients in the sparse filters 186 and 188 are determined by the considerably smaller number of selected coefficients, 184 and 185, for example, 16 each. The delayed received signal 171 is input to a multiplier circuit 194 having input gain 176 as the multiplier coefficient. This creates a signal amplitude scaled input 195 to the sparse FFF 186. The amplitude scaling matches the amplitude of the signal component input to the FFF with the amplitude of the symbol decisions 193 that are input to the FBF 188. This allows the sparse FFF output 187 and the sparse FBF output 189 to be directly input to summation circuit 190 to form the MMSE-DFE output 191, the channel equalized signal that is input to the subsequent symbol detection process (not shown). The MMSE-DFE output 191 is also input to symbol decision circuitry 192 that provides the symbol decisions 193 that are in turn input to the sparse FBF 188.

As drawn in FIG. 5, the sparse FFF and FBF filters, 186 and 188, and the nonlinear symbol decision circuitry 192 constitute an example of a hard decision-decision feedback equalizer (H-DFE) structure. The H-DFE is well known and has been extensively analyzed. Alternative decision feedback equalizer (DFE) structures exist that can readily take advantage of the coefficient selection and sparse time domain filter elements of the SC-SBE method by simply substituting the sparse coefficient FFF and FBF filters defined above for the full coefficient FFF and FBF filters of the alternative DFE structure. An example of an alternative DFE structure is the soft decision/delayed decision integration of the DFE and Viterbi decoder, referred to as the S/D-DFE and developed in S. Lek Ariyavisitakul, and Ye Li, "Joint Coding and Decision Feedback Equalization for Broadband Wireless Channels", IEEE J. on Selected Areas in Communications, Vol. 16, No. 9, December, 1998. They indicate the S/D-DFE provides an approximate 3 dB performance improvement over the H-DFE. The performance advantage of the S/D-DFE structure over the H-DFE structure can be expected to be retained when these SC-SBE methods and apparatus are applied to both structures.

The coefficient selection process 182 is a pruning of the complete set of coefficients that are output from the MMSE-DFE coefficient computation process 178. The coefficient selection process provides three major benefits: the ability to perform computationally efficient time domain equalization of channels having large multipath delay spreads; the ability to implement arbitrary TDD/TDMA bandwidth allocations using the minimal allocation granularity of one single carrier symbol; and improved overall receiver performance by avoiding the use of FFF and FBF coefficients which decrease the performance. The first benefit is based on the fact that sparse time domain filters can be used to efficiently implement the reduced set of selected filter coefficients, the number of selected filter coefficients probably needs to be less than 32. The second benefit is based on the fact that time domain filters, in general, allow arbitrary TDD/TDMA bandwidth allocations with the minimal granularity, e.g., one single carrier (SC) symbol. As discussed above, in contrast to the block processing frequency domain filtering techniques, standard time domain filtering does not impose block restraints on the TDD/TDMA allocation granularity, i.e., there is no additional computation cost for arbitrary start/stop allocations into a TDD time frame. The third benefit is improved overall receiver performance, in terms of the nature of the typical CIR of a WMAN system and the coefficient selection process.

That the symbol error rate versus signal to noise ratio (SER versus SNR) performance can be improved with fewer taps is evident from the trivial example of the ideal additive white Gaussian noise (AWGN) channel. The DFE filter configuration that achieves the optimum performance for an AWGN channel is known to be equivalent to an all-pass filter. For the DFE to be equivalent to an all-pass filter requires that the tap selection algorithm select one FFF tap and zero FBF taps.

That the performance is typically improved is evident in the nature of the WMAN RF propagation CIR. An optimally sampled CIR typically has a few clusters of coefficients with each cluster consisting of only a few significant coefficients. This sparsely clustered feature of a WMAN propagation channel CIR is due to the reflections near either the transmit or receive antennas being convolved with reflections far from either antenna. The desired FFF and FBF filters mimic this sparsely clustered feature of the WMAN CIR. Setting maximums of 16 FFF and 16 FBF coefficients is a conservative design for such channels. However, the maximum allowed number of coefficients is not critical and can be left up to the implementation design engineer based on detailed engineering design considerations. For example, extensive computer simulations with accepted models for WMAN channels indicate that acceptable performance is obtained with the maximum number of allowed coefficients set anywhere between 8 and 32.

This leaves the relatively rare cases where, in order to obtain the best DFE receiver performance, the WMAN CIR demands more than the allowed maximum of N_sparse=16 or so coefficients each in the FFF and FBF filters. Fortunately, since the example coefficient selection processes discussed below select the most significant coefficients, the performance degradation in these cases will be slight. The slightly diminished DFE performance associated with having only the N_sparse most important coefficients is a good trade for what the coefficient selection process provides: efficient time domain equalization for NLOS WMAN channels with very large delay spreads and the bandwidth efficiency associated with arbitrary TDD allocations.

For example, consider an SC-SBE processor that estimates the CIR and computes the MMSE-DFE coefficients based on a received preamble composed of a 256 symbol length Frank CAZAC as defined in the IEEE Standard 802.16a.TM.-2003. In this example, the MMSE-DFE coefficient computation 188 outputs NF=256 computed FFF coefficients 180 and NB=255 computed FBF coefficients 181. The coefficient selection procedure 182 inputs the complete set of computed coefficients and outputs, in this example at most 16 or so most significant FFF coefficients 184 and at most 16 or so most significant FBF coefficients 185. With these selected coefficients, the sparse time domain FFF and FBF filters, 186 and 188, efficiently span a delay spread of 512 symbols while retaining a TDD/TDMA allocation granularity of an individual symbol.

Figure 6:
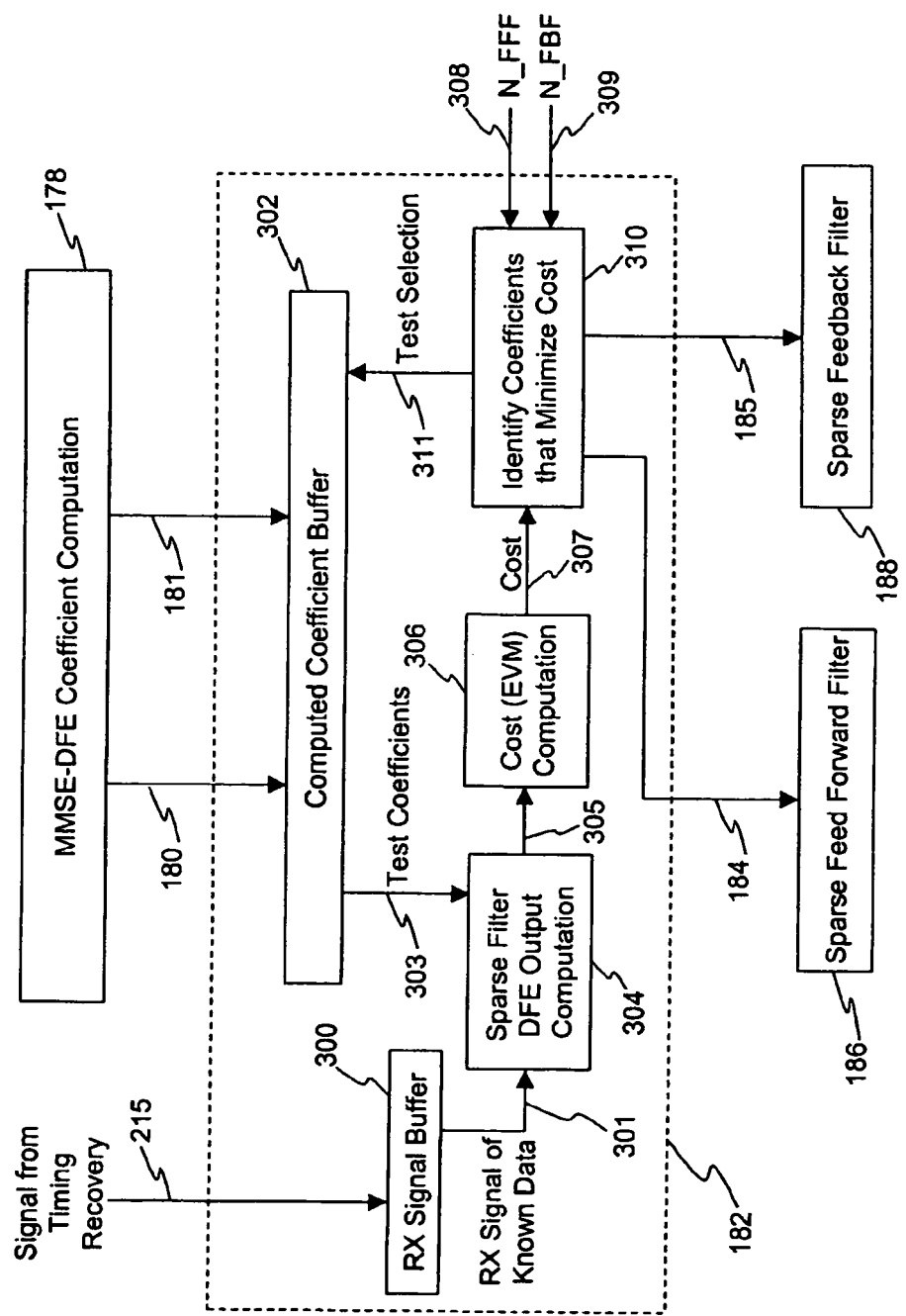
FIG. 6 is a block diagram illustrating a DFE performance based coefficient selection process with an exhaustive search.

FIG. 6 illustrates a schematic block diagram of one example embodiment of the coefficient selection process 182. In this embodiment, the coefficients are selected jointly for the FFF and FBF filters based on the minimization of a DFE performance cost function. The received (RX) signal from timing recovery circuitry 215 is stored in an RX signal buffer 300. The complete set of computed FFF and FBF coefficients, 180 and 181, are stored in a computed coefficient buffer 302. Portions of the RX signal that contain known data 301 and a test FFF and FBF coefficient subset 303 are input to a sparse filter DFE computation circuit 304 that provides the DFE output 305 for input to a cost function computation circuit 306. An example of a DFE performance cost function is the averaged error vector magnitude (EVM) that can be computed as the standard error of the DFE output relative to the known data. The DFE performance cost 307 is input to a minimization process 310 that identifies the coefficient selection that minimizes the cost subject to the constraints that the number of FFF coefficients cannot exceed N_FFF 308 and the number of FBF coefficients cannot exceed N_FBF 309. The minimization process 310 can be thought of as performing a non-linear parameter estimation where the parameters being estimated are the addresses defining the coefficient subset, e.g., the test selection 311, that minimizes the DFE performance cost 307. The results of the cost minimization coefficient selection, i.e., the sparse coefficient vectors, 184 and 185, are output to the sparse FFF and FBF filters, 186 and 188, respectively.

Figure 7:
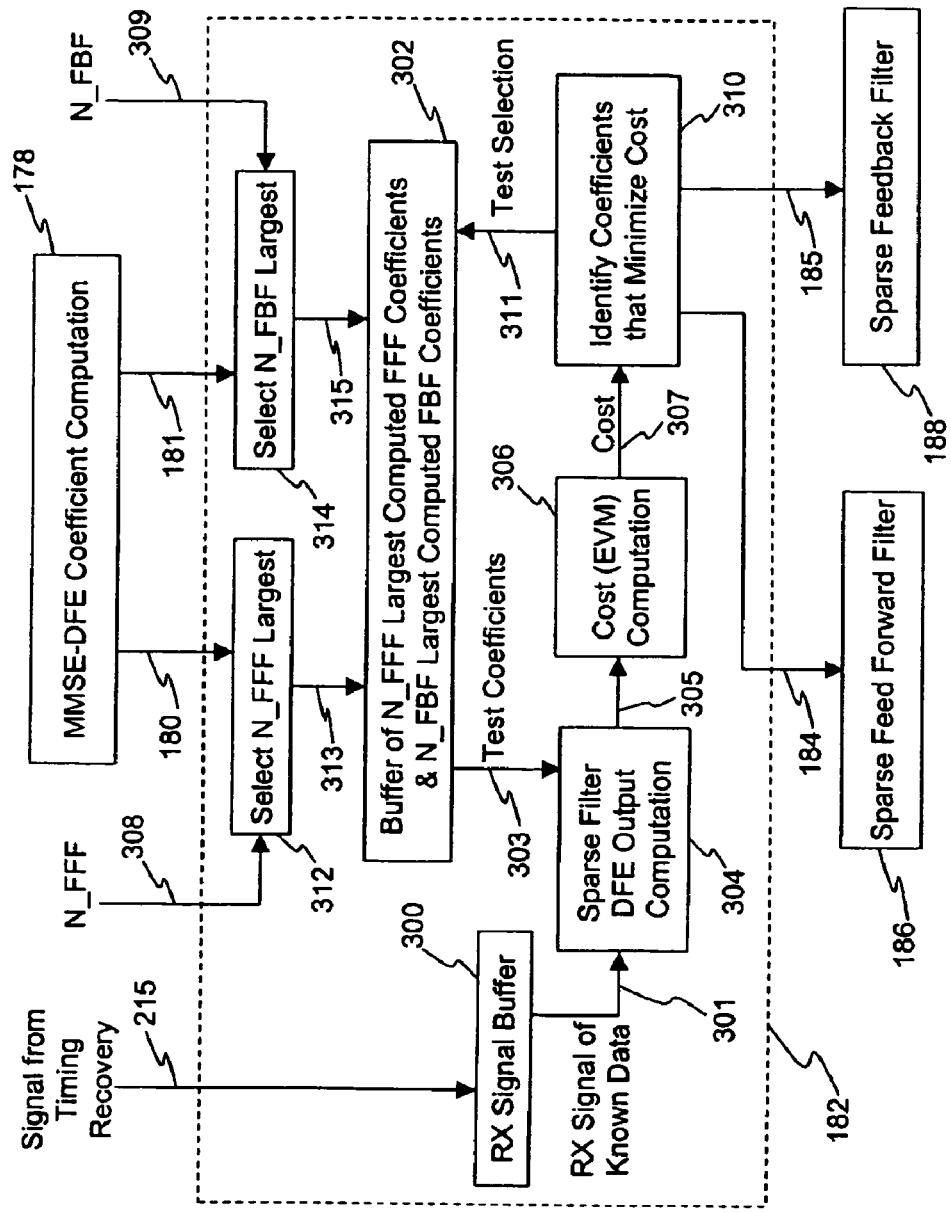
FIG. 7 is a block diagram illustrating a DFE performance based coefficient selection process with amplitude based preselection.

A potential problem with the above embodiment of the coefficient selection process 182, as illustrated in FIG. 6, is that it is exhaustive in its search and may, consequently, require excessive time and computation. FIG. 7 illustrates a schematic block diagram of a modification of the DFE cost minimization based coefficient selection process that will reduce the search time and the associated computation. In this example embodiment, a pre-selection of the computed coefficients to be searched is performed based on the coefficient amplitude. The pre-selection consists of examining the computed FFF and FBF coefficients, 180 and 181, to perform a selection 312 of the N_FFF largest amplitude FFF coefficients 313 and a selection 314 of the N_FBF largest amplitude FBF coefficients 315. The N_FFF largest FFF coefficients 313 and the N_FBF largest FBF coefficients 315 are stored in a coefficient buffer 302 that defines the coefficient search space for the minimization process 310. This pre-selection based on amplitude can be expected to have little effect on the DFE coefficient selection, i.e., the sparse coefficient vectors, 184 and 185, since the exclusion of small amplitude filter coefficients generally have little effect on the filter output.

Figure 8:
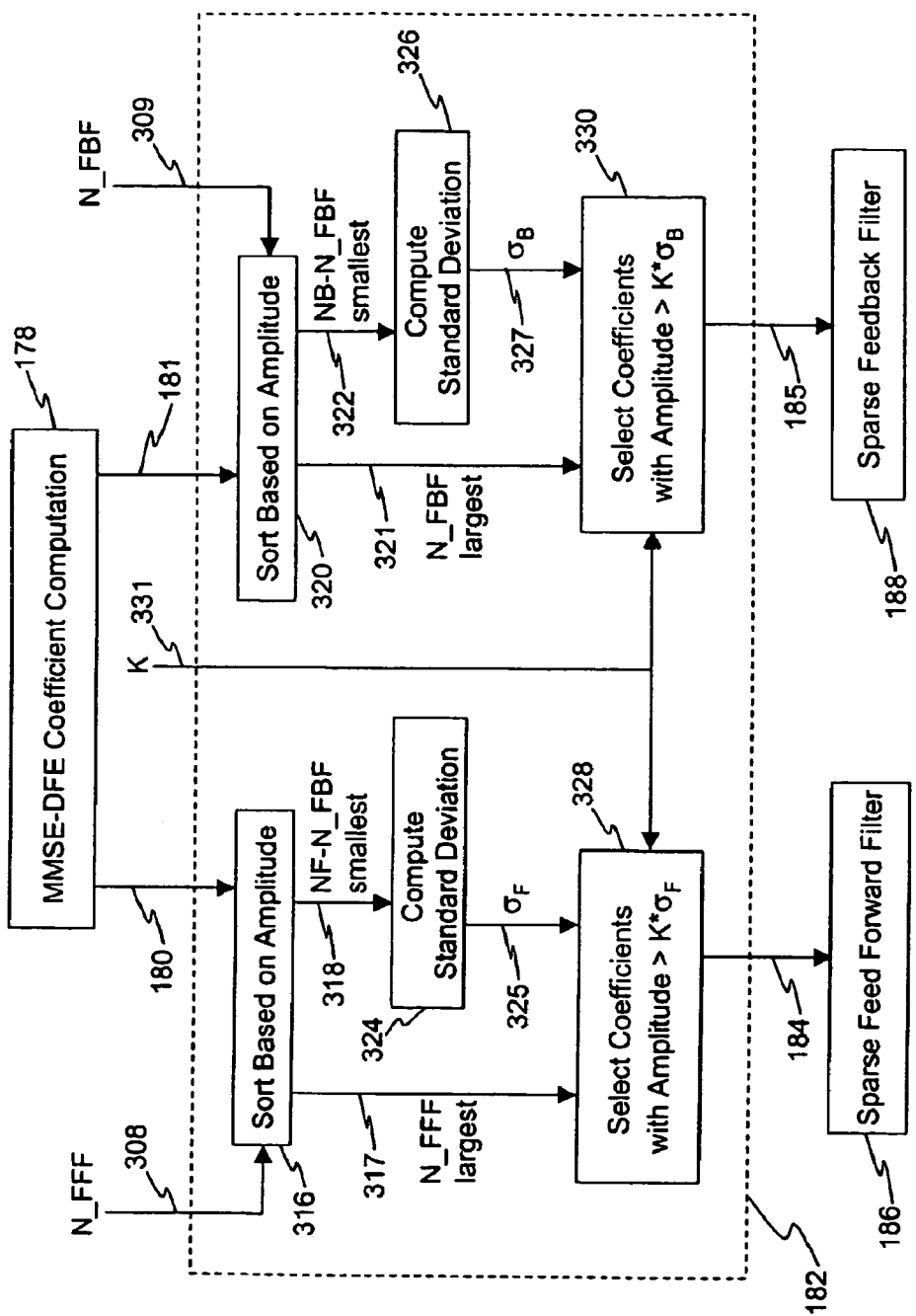
FIG. 8 is a block diagram illustrating an amplitude threshold based coefficient selection process.

FIG. 8 illustrates a schematic block diagram of a third example embodiment of the coefficient selection process 182. This embodiment requires neither the above iterative DFE performance cost minimization procedures nor any input of the received signal. In this embodiment the coefficients are selected based on the computed coefficient's amplitude satisfying two conditions: it is one of the N_FFF or N_FBF largest amplitude coefficients of the computed FFF or FBF coefficients, respectively; and it is bigger than $K^*.sigma..sub.F$ or $K^*.sigma..sub.B$, where $sigma..sub.F$ or $.sigma..sub.B$ are the standard deviations of the NF-N_FFF smallest amplitude computed FFF coefficients or NB-N_FBF smallest amplitude computed FBF coefficients, respectively. Threshold parameter input 331, represented by the variable K, that provides protection against coefficient computation noise. NF and NB are the number of computed FFF and FBF coefficients, 180 and 181, respectively. N_FFF and N_FBF, 308 and 309, are the maximum number of non-zero FFF and FBF coefficients, 184 and 185, respectively, to be selected.

As illustrated in FIG. 8, the computed FFF coefficients 180 are sorted by amplitude sorting circuitry 316 into the N_FFF largest coefficients 317 and the NF-N_FFF smallest coefficients 318. Similarly, the computed FBF coefficients 181 are sorted by amplitude sorting circuitry 320 into the N_FBF largest coefficients 321 and the NB-N_FBF smallest coefficients 322. The sets of smallest coefficients, 318 and 322, are input to standard deviation circuitry, 324 and 326, that output the standard deviations, sigma..sub.F 325 and .sigma..sub.B 327. The threshold comparison circuitry 328 selects the non-zero sparse filter FFF coefficients 184 as the subset of the N_FFF largest computed FFF coefficients 317 that are also greater than $K*\sigma_F$. Similarly, the threshold comparison circuitry 330 selects the non-zero sparse filter FBF coefficients 185 as the subset of the N_FBF largest computed FBF coefficients 321 that are also greater than $K*\sigma_B$.

Comparing the above three example embodiments of the coefficient selection process 182, that are diagrammed in FIGS. 6, 7 and 8, the following observations can be made. All three embodiments input the complete set of computed coefficients, 180 and 181, from the MMSE-DFE coefficient computation process 178 and output the selected filter coefficients, 184 and 185, that contain at most N_FFF and N_FBF non-zero coefficients, respectively. The embodiments diagrammed in FIGS. 6 and 7 require input of the RX signal and perform an iterative non-linear cost minimization to achieve the coefficient selection. The embodiment diagrammed in FIG. 7 performs a pre-selection based on the coefficient amplitude to reduce the coefficient search space and the associated computations. The embodiment diagrammed in FIG. 8 selects the coefficients based solely on the coefficient amplitude and can be expected to require the least amount of computation and be the simplest to implement.

The embodiment of FIG. 6 is useful to illustrate the fundamental concept of the coefficient selection process 182 which is to eliminate computed coefficients so that the sparse time domain filters can be used in the DFE with either a DFE performance improvement or an insignificant performance loss. However, the embodiment of FIG. 6 is anticipated to exhibit an excessive computational demand. On the other hand, embodiments of FIGS. 7 and 8 are practical implementations that have been extensively tested by means of computer simulation using accepted WMAN CIR models. Some of these simulation results are described in Russell McKown, "802.16e Proposal: Link Performance of WirelessMAN-SCa Mobile Subscriber Stations", IEEE c802.16e-03/19r2, 2003 Mar. 11, which is incorporated herein by reference.

What is claimed is:

1. An equalization method for a single carrier wireless transmitter apparatus, comprising:
    determining a channel impulse response;
    calculating feed forward coefficients and feedback coefficients for at least one time domain filter in a decision feedback equalizer based on the channel impulse response; and
    selecting a subset of the feed forward coefficients and a subset of the feedback coefficients wherein a number of coefficients in each subset is less than a total number of the determined coefficients.

2. The method of claim 1, wherein selecting a subset of feed forward coefficients and a subset of the feedback coefficients comprises: selecting a coefficient having an amplitude being one of a largest coefficient amplitudes of the feed forward filter coefficients or the feedback filter coefficients.

3. The method of claim 2, wherein selecting a subset of feed forward coefficients and a subset of the feedback coefficients further comprises:
    selecting a coefficient having an amplitude greater than $K*\sigma_F$ or $K*\sigma_B$, wherein $\sigma_F$ and $\sigma_B$ are standard deviations of a subset of coefficients whose amplitudes are not one of the largest coefficient amplitudes of the feed forward filter coefficients or the feedback filter coefficients, wherein K is a threshold parameter that provides protection against coefficient computation noise.

4. The method of claim 1, wherein the selecting a subset of the feed forward coefficients and a subset of the feedback coefficients comprises:
    pre-selecting the computed feed forward coefficients and feedback coefficients.

5. The method of claim 4, wherein the pre-selecting the computed feed forward coefficients and feedback coefficients comprises:
    examining the computed feed forward coefficients and feedback coefficients; and
    storing each of the computed coefficients having an amplitude being one of a largest coefficient amplitudes in a coefficient buffer that defines a coefficient search space for a minimization process.

6. The method of claim 3, wherein selecting a coefficient having an amplitude greater than $K*\sigma_F$ or $K*\sigma_B$ comprises:
    sorting the computed feed forward coefficients into a number of largest feed forward coefficients and a number of smallest feed forward coefficients;
    sorting the computed feedback coefficients into a number of largest feedback coefficients and a number of smallest feedback coefficients; and
    calculating $\sigma_F$ and $\sigma_B$ based on the number of smallest feed forward coefficients and the number of smallest feedback coefficients.

7. The method of claim 6, further comprising:
    selecting a coefficient to include in the subset of feed forward coefficients if the amplitude of the coefficient is one of a largest coefficient amplitudes of the feed forward filter coefficients and is greater than $K*\sigma_F$; and
    selecting a coefficient to include in the subset of feedback coefficients if the amplitude of the coefficient is one of a largest coefficient amplitudes of the feedback filter coefficients and is greater than $K*\sigma_B$.

8. Apparatus for equalizing single carrier single burst signals, comprising:
    circuitry for estimating a channel impulse response;
    circuitry for determining feed forward filter coefficients and feedback filter coefficients for a decision feedback equalizer having sufficient length to cover a maximum anticipated channel impulse response; and
    circuitry for selecting a subset of the feed forward coefficients and a subset of the feedback coefficients, wherein a number of coefficients in each subset is less than a total number of the determined coefficients.

9. The apparatus of claim 8, wherein circuitry for selecting a subset of the feed forward coefficients and a subset of the feedback coefficients comprises:
    circuitry for selecting each coefficient in the subsets of the coefficients based on an amplitude of the coefficient satisfying at least one of:
        the amplitude being one of a largest coefficient amplitudes of the feed forward filter coefficients or the feedback filter coefficients; and
        the amplitude being greater than $K*\sigma_F$ or $K*\sigma_B$, where $\sigma_F$ or $\sigma_B$ are standard deviations of a subset of coefficients whose amplitudes are not one of the largest coefficient amplitudes of the feed forward filter coefficients or the feedback filter coefficients, wherein K is a threshold parameter that provides protection against coefficient computation noise.

10. The apparatus of claim 8, wherein circuitry for selecting a subset of the feed forward coefficients and a subset of the feedback coefficients comprises:
    circuitry for pre-selecting the feed forward filter coefficients and feedback filter coefficients.

11. The apparatus of claim 10, wherein the circuitry for pre-selecting the feed forward filter coefficients and feedback filter coefficients comprises:
circuitry for examining the determined feed forward coefficients and feedback coefficients;
circuitry for selecting a coefficient having an amplitude being one of a largest coefficient amplitudes from the determined feed forward coefficients and feedback coefficients; and
circuitry for storing the coefficient having an amplitude being one of a largest coefficient amplitudes in a coefficient buffer that defines a coefficient search space for a minimization process.

12. The apparatus of claim 9, wherein circuitry for selecting a subset of the feed forward coefficients and a subset of the feedback coefficients comprises:
circuitry for sorting the determined feed forward coefficients into a number of largest feed forward coefficients and a number of smallest feed forward coefficients; and
circuitry for calculating the sigma..sub.F based on the number of smallest feed forward coefficient.

13. The apparatus of claim 9, wherein circuitry for selecting a subset of the feed forward coefficients and a subset of the feedback coefficients comprises:
circuitry for sorting the determined computed feedback coefficients into a number of largest feedback coefficients and a number of smallest feedback coefficients; and
circuitry for calculating the sigma..sub.B based on the number of smallest feedback coefficients.

14. The apparatus of claim 12, wherein circuitry for selecting a subset of the feed forward coefficients and a subset of the feedback coefficients further comprises:
circuitry for selecting a coefficient to include in the subset of feed forward coefficients if the amplitude of coefficient is one of a largest coefficient amplitudes of the feed forward filter coefficients and is greater than K*.sigma..sub.F.

15. The apparatus of claim 13, wherein circuitry for selecting a subset of the feed forward coefficients and a subset of the feedback coefficients further comprises:
circuitry for selecting a coefficient to include in the subset of feedback coefficients if the amplitude of the coefficient is one of a largest coefficient amplitudes of the feed forward filter coefficients and is greater than K*.sigma..sub.B.

16. Apparatus for equalizing single carrier single burst signals, comprising:
circuitry for estimating a channel impulse response;
circuitry for determining feed forward filter coefficients and feedback filter coefficients for a decision feedback equalizer having sufficient length to cover a maximum anticipated channel impulse response;
circuitry for sorting the feed forward filter coefficients and feedback filter coefficients based on amplitudes of the coefficients;
a standard deviation circuitry for computing standard deviations of the coefficients whose amplitudes are not one of the largest coefficient amplitudes of the feed forward filter coefficients or the feedback filter coefficients; and
a circuitry for selecting a subset of the feed forward coefficients and a subset of the feedback coefficients based on the standard deviations.

17. The apparatus of claim 16, wherein the circuitry for sorting the feed forward filter coefficients and feedback filter coefficients based on amplitudes of the coefficients comprises:
circuitry for sorting circuitry for sorting the determined computed feedback coefficients into a number of largest feed forward coefficients and a number of smallest feed forward coefficients based on the amplitudes; and
circuitry for sorting the determined computed feedback coefficients into a number of largest feedback coefficients and a number of smallest feedback coefficients based on the amplitudes.

18. The apparatus of claim 17, wherein the standard deviation circuitry comprises a circuitry for computing the standard deviations based on the smallest number of feed forward coefficients and the smallest number of feedback coefficients, and
the circuitry for selecting a subset of the feed forward coefficients and a subset of the feedback coefficients comprises a threshold comparison circuitry for comparing the number of largest feed forward coefficients and the number of smallest feedback coefficients to a product of the standard deviations and a threshold parameter that provides protection against coefficient computation noise.

\* \* \* \* \*